United States Patent
BT M Iqbar et al.

(10) Patent No.: US 12,413,075 B1
(45) Date of Patent: Sep. 9, 2025

(54) ENERGY MANAGEMENT SYSTEM AND MICROGRID

(71) Applicant: Petroliam Nasional Berhad (PETRONAS), Kuala Lumpur (MY)

(72) Inventors: Izleena BT M Iqbar, Kuala Lumpur (MY); Fauzy Omar Basheer B Osman, Kuala Lumpur (MY); Hsiu Eik Lee, Kuala Lumpur (MY); Zahari A Razak, Kuala Lumpur (MY); M Suffian B Mohtar, Kuala Lumpur (MY); M Faudzi B M Yasir, Kuala Lumpur (MY); M Faizal B Hamdan, Kuala Lumpur (MY); Salim B Sumormo, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 0 days.

(21) Appl. No.: 18/258,038

(22) PCT Filed: Dec. 17, 2021

(86) PCT No.: PCT/MY2021/050122
§ 371 (c)(1),
(2) Date: Jun. 16, 2023

(87) PCT Pub. No.: WO2022/131905
PCT Pub. Date: Jun. 23, 2022

(30) Foreign Application Priority Data

Dec. 17, 2020 (MY) ............................ PI2020006792

(51) Int. Cl.
*H02J 3/38* (2006.01)
*F03D 9/11* (2016.01)
(Continued)

(52) U.S. Cl.
CPC ............... *H02J 3/381* (2013.01); *F03D 9/11* (2016.05); *F03D 13/256* (2023.08);
(Continued)

(58) Field of Classification Search
CPC ...... H02J 3/38; H02J 3/381; H02J 3/00; H02J 3/0012; H02J 2300/28; H02J 2300/10; F03D 9/11; F03D 13/256
See application file for complete search history.

(56) References Cited

U.S. PATENT DOCUMENTS 10,519,933 B2 * 12/2019 Dharmadhikari ..... F03D 7/0284
2012/0053748 A1    3/2012 Branscomb
(Continued)

FOREIGN PATENT DOCUMENTS

| AU | 2016250547 A1 | 12/2017 |
| CN | 102156457 B | 11/2013 |
| EP | 3376631 B1 | 6/2020 |

OTHER PUBLICATIONS

International Search Report and Written Opinion, PCT Application No. PCT/MY2021/050122, dated May 19, 2022, 9 pages.
(Continued)

*Primary Examiner* — Robert L Deberadinis
(74) *Attorney, Agent, or Firm* — Mannava & Kang, P.C.

(57) ABSTRACT

A method of controlling operation of a microgrid using an EMS, the microgrid comprising a plurality of distributed energy resources including at least one controllable distributed hydrocarbon fueled generator and electrical energy storage devices, the method comprising: the EMS measuring a cumulative availability status of each distributed energy resource, and assigning a state of the microgrid based upon said cumulative status; determining whether a critical opera-
(Continued)

tion can proceed based upon said state; enabling the critical operation based upon the determining step having a predetermined outcome.

13 Claims, 9 Drawing Sheets

(51) Int. Cl.
  *F03D 13/25* (2016.01)
  *H02J 3/00* (2006.01)
(52) U.S. Cl.
  CPC ......... *H02J 3/0012* (2020.01); *H02J 2300/10* (2020.01); *H02J 2300/28* (2020.01)

(56) References Cited

U.S. PATENT DOCUMENTS

2018/0262005 A1  9/2018  Lazaris
2019/0157876 A1  5/2019  Dobrowolski et al.

OTHER PUBLICATIONS

Malaysian Search Report and Adverse Report for Malaysian Application No. PI2020006792, dated Mar. 13, 2023, 5 pages.
Partial Supplementary European Search Report, EP Application No. 21907204.8, dated Oct. 25, 2024, 12 pages.

\* cited by examiner

ENERGY MANAGEMENT SYSTEM AND MICROGRID

CLAIM FOR PRIORITY

The present application is a national stage filing under 35 U.S.C 371 of PCT application number PCT/MY2021/050122, having an international filing date of Dec. 17, 2021, which claims priority to Malaysian patent application number PI2020006792, having a filing date of Dec. 17, 2020, the disclosures of which are hereby incorporated by reference in their entireties.

FIELD OF THE INVENTION

The invention relates to the control and management of distributed energy resources forming a microgrid. In particular, the invention relates to an EMS to achieve the control and management in an offshore environment when integrating new wind energy generator installations with existing fuel-based generators.

BACKGROUND

Typical methods of offshore power generation are those that utilize variants of GTG (Gas Turbine Generator), DEG (Diesel Engine Generator) and other fuel-based generators. For very small power requirements (sub 100 kW), reasonably sized solar panels/mini wind turbines can be erected on an existing platform. The latter examples are usually for small power generation requirements and are not able to par the power generated by a GTG, for instance.

There is also a need for reduced maintenance of such conventional fuel-based power generators and to move towards 'greener' offshore operations in order to meet climate goals and reduced emission targets. However, offshore hydrocarbon exploration and production operations still require the assurance of reliable power generation from well-known conventional sources such as GTGs, and this is especially true for brownfield projects which already have existing GTGs, DEGs, etc. Another point of contention for existing assets are also that which their old conventional power generation & control systems/workflows have yet to reach their useful design life (it would make no sense economically/from depreciation pov to remove such machines in favour of new capital investment in greener offshore energy systems).

SUMMARY OF INVENTION

In a first aspect, the invention provides a method of controlling operation of a microgrid using an EMS, the microgrid comprising a plurality of distributed energy resources including at least one controllable distributed hydrocarbon fueled generator and electrical energy storage devices, the method comprising: the EMS measuring a cumulative availability status of each distributed energy resource, and assigning a state of the microgrid based upon said cumulative status; determining whether a critical operation can proceed based upon said state;

enabling the critical operation based upon the determining step having a pre-determined outcome.

In a second aspect, the invention provides an EMS for controlling an operation of a microgrid; the microgrid comprising a plurality of distributed energy resources including at least one controllable distributed hydrocarbon fueled generator and an electrical energy storage device; the EMS arranged to measure a cumulative availability status of each distributed energy resource, and assign a state of the microgrid based upon said cumulative status; said EMS arranged to enable a critical operation upon said state.

In a third aspect, the invention provides a wind-turbine facility comprising: a wind turbine connectable to a microgrid; an energy storage system mounted within a cavity of a substructure of the wind turbine, said energy storage system arranged to be connected to the microgrid; wherein said wind turbine is arranged to charge said energy storage system.

Continuous operation of an offshore oil and gas platform requires a steady and secure energy supply. In order to generate the average energy requirement of the platform, the operation of a GTG or of a charged ESS and WT is sufficient.

Where the critical operation is, for instance, the start of the COTP, this may lead to situations in which not enough energy is available. For example, in order to support the short start-up phase of COTP, where approx. 3 MVAr may be required for approx. 10 s, at least both GTGs have to be in operation or one GTG and the ESS must be activated.

If one GTG or ESS fails, then the other GTG should be started. For this start phase, about 30 minutes will be scheduled as maximum value. During this time, there is not enough energy available to start the COTP. The start of the COTP is blocked. The enable signal is generated after the start-up of the GTG.

The energy generated by the WT can be split up to supply the grid and charge the ESS. Both is possible by using the Multi Source Converter (MSC). The WT energy production depends on the wind conditions. Thus, the WT cannot be considered alone as a permanent reliable source of energy. The ESS should always be activated additionally. In case the ESS is maximally charged, the WT's power output will be limited.

The ESS can store up to a predefined kWh of energy. A minimum state of charge should always be available. As described above, when a GTG fails, the stored energy is needed to power the platform. The ESS can be charged by the WT and the GTG. A black start is not supported by the ESS.

A counter signals the time available until the ESS level-zero is reached. The EMS provides this counter depending on the ESS charging level and energy consumption.

The additional diesel generator EDG or an equivalently sized generator is only needed for a restart, black start, after a complete power shutdown. The EDG will then supply the platform to support the start-up of the GTG.

The invention therefore provides an EMS for controlling a microgrid. The EMS measures the cumulative availability status of all the connected distributed energy resources, and assigns a state based upon said cumulative status. Based upon that state, the EMS may then determine whether a critical operation, such as operating the Crude Oil Transfer Pump (COTP), can proceed.

The invention therefore provides a microgrid concept that may scale from the kilowatts, to low megawatts to double/triple digit MW for 'green'/'new' and 'brown'/'existing or old' The invention may also provide gas producing offshore assets with the ability to monetize fuel gas into sales gas. The gap of existing solutions is evident amongst 'old/brownfield' assets whereby an existing hydrocarbon-based power generation is already in-place and that we wish to not deprecate all the existing generators immediately, as they may still have amortizable value.

Embodiments of the invention may therefore provide a microgrid concept that may be incrementally adoptable (i.e. automation of new power source, with human intervention on older hydrocarbon fired devices) and must be able to be integrated with existing workflows/controls of older power generators without disruption to hydrocarbon production operations.

In one embodiment, the invention may provide an energy source agnostic strategy using an energy management system (EMS) as an intermediary control to integrate offshore wind energies and hydrocarbon typed power generation like gas turbines/diesel gensets.

Thus, in a still further embodiment, the invention may provide an offshore microgrid which has at its core, an energy (or power source)-agnostic, energy-management system (EMS) that is capable of managing energy storage and delivery from various power sources such as offshore renewable wind with energy storage and/or a conventional power generator/source such as GTG.

This may provide for a scalable system, including facilities with small energy requirements which are unable to justify the investment required for deployment of a typical offshore wind energy setup (i.e. with substation etc). This scalable system may introduce methods of utilization of the EMS to optimize fuel gas usage which may then be converted into sales gas.

In a further aspect, the microgrid may also be scaled in such a way that the generator source itself (i.e. wind turbine tower) is comprehensively self-contained with all required inbuilt electronics and energy storage mechanisms so that a separate substation platform is not necessary. Such a generator source may be placed atop a floating substructure and transported/installed as a single, plug and play unit when integrating with an existing offshore platform via subsea cables.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

As shown in FIGS. 1A to 1E, the EMS according to one embodiment of the present invention includes an operating methodology that allows the integration of a new energy source like a wind generator to an existing hydrocarbon-based system that is prevalent on offshore platform. An objective of the EMS strategy includes the introduction of a new energy source (such as a wind turbine) must not adversely affect existing operational workflow.

Of primary importance for an embodiment of the EMS applied to a microgrid for an offshore platform comprising of introduction of new intermittent power source such as wind turbine generator is to ensure the reliable operation of critical operation, particularly critical equipment that require high starting current/inrush current. Broadly, the microgrid may be controlled by the EMS, measure the cumulative availability status of each distributed energy resource, and assign a state based upon said cumulative status. Based upon that, the EMS may then determine whether a critical operation can proceed. It is noted that the fundamental enabler and provider of this benefit of readiness for instantaneous high current draw is the Energy Storage System (ESS) and its converters. The EMS then plays the role as governing logic controller that intermediates between the ESS, new wind turbine generators and existing fuel-fired generators, in providing reliable power to the entire operation/platform.

An example of a critical operation that requires high starting current is the operation of the crude oil transfer pump (COTP). If the viability of power supply to the high starting current of the COTP is compromised, or the possibility of inconsistent power supply, then the COTP cannot be started, and the resulting disruption has the potential for long term damage and the disruption to upstream and downstream operations. Such a scenario is not acceptable, and the EMS is responsible as the control logic to ensure the highest levels of power availability within the constraints of the integrated microgrid. Essentially, the new wind turbine generators require the EMS for its reliable integration into existing fuel-based power generation system without disrupting active/on-going platform businesses and operations.

To this end, the operation of the COTP will be used in the foregoing example as a means of describing how such disruption may be avoided during new wind turbine generator integration with existing conventional power sources through the aforementioned EMS driven strategy. The operation of other equipment that require high inrush current/starting current which may also benefit from a EMS operated microgrid, are for instance:

i) Instrument air compressors
  ii) Gas turbines/compressors
  iii) Large hydraulic systems and pumps
  iv) In general, applicable to any big motors that are driving pumps or compressors The above particularly highlights the equipment that require high inrush current/starting current as such instances typically put more stress and demand more rigor from the energy supply train on the platform.

Figure 2:
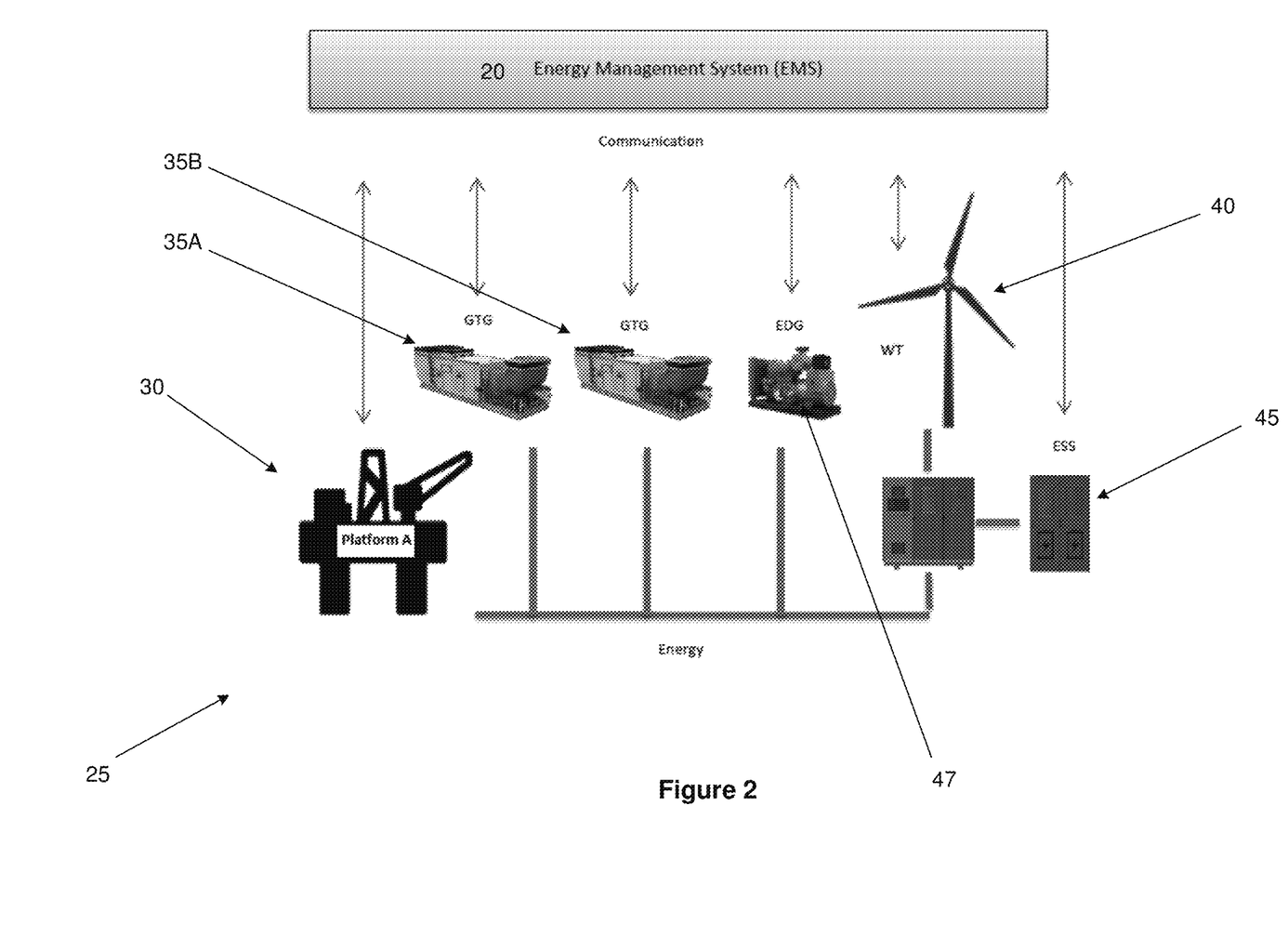
FIG. 2 is a schematic view of an EMS and microgrid according to one embodiment of the present invention.

The example description of the operating states of an EMS 20 according to the present invention is based upon a microgrid 25 for an offshore platform 30, such as that shown in FIG. 2, where the distributed energy resources include:

i) Two GTGs 35A,B ii) A wind turbine 40, and;

iii) An energy storage system (ESS) 45, and;

iv) An emergency generator 47.

As discussed, the EMS control objective is to enable reliable operations (undisrupted operation due to introduction of new technology/power source) while reducing the reliance on at least one or more GTG(s).

Apart from providing a means for the renewable energy to be added as a distributed energy resource for an existing microgrid, the EMS strategy allows for controlled use of hydrocarbon-based power generation which may lead to added savings on fuel loads, which may further be on-sold.

The following provides an example of the operation modes possible for the GTG's relative to the other energy resources. A GTG is either turned off or is started and then switches to operating mode on. A frequent change of state of the GTG should be avoided.

The WT provides the operating modes off and on. In the on state, the EMS specifies a power set point. This set point is not exceeded by the WT. However, due to changing wind conditions, the generated power of the WT can be below or even reach the value 0. Generally, the following modes are adjustable: Off, 0 . . . level-1, 0 . . . level-2 or 0 . . . level-max power production.

The ESS provides the operating modes off, charged to the UPS-level, charged between UPS-level and max-level and loaded max-level. The UPS-level is defined by the amount of energy needed by the platform during the start transition phase of a GTG and in addition an energy storage amount that compensates for the fluctuating energy production of the WT. In this concept, the ESS serves primarily as a short-term grid support when the COTP starts. The GTG takes over the base load and the ESS supports the grid, if necessary. Since the COTP start-up phase is short and this process is done at cyclic intervals, the time between these events is used to charge the ESS and hold it at the UPS-level. This is done by the currently activated generators WT and/or GTG. The UPS level can be freely parameterized (eg 700 kWh). Furthermore, in the event of a GTG failure, the ESS will power the platform until the other GTG is started. During the start-up phase of this GTG, the launch of the COTP is blocked. For this functionality, the ESS should always be kept at least at the UPS level. If there is a lot of wind energy available, the ESS will be charged up to the level max. This concept avoids frequent start-up of the GTG and ensures that the platform is supplied.

The GTGs support the operating modes off and on.

TABLE 1

Generator Operation Modes

| Generator | Operation modes | Description |
|---|---|---|
| GTG1 | Off | GTG1 is off |
| | On | GTG1 supports the grid, depend on load with max 1500 kW. If the GTG1 is not in operation, it will and should be started now. |
| GTG2 | Off | GRG2 is off |
| | On | GTG2 supports the grid, depend on load with max 1500 kW. If the GTG2 is not in operation, it will and should be started now |

TABLE 1-continued

Generator Operation Modes

| Generator | Operation modes | Description |
|---|---|---|
| WT | Off | WT is off |
| | Up to level-1 | WT power setpoint max is level-1. The setpoint is specified by the EMS. The achievable power is dependent on the wind and limited to the setpoint level-1 (e.g. 750 KW). |
| | Up to level-2 | WT power setpoint max is level-2. The setpoint is specified by the EMS. The achievable power is dependent on the wind and limited to the setpoint level-2 (e.g. 1500 kW). |
| | Up to level-max | WT power setpoint max is level-max. The setpoint is specified by the EMS. The achievable power is dependent on the wind and limited to the setpoint level-max (e.g. 2000 kW). |
| ESS | Off | ESS energy is not available and off |
| | 0 . . . <UPS-Level | ESS is available. It is possible to charge the ESS. The grid support until a GTG is started is not reliable possible. The stored energy is less than the UPS-Level. The stored energy in the ESS should preferably be above the UPS-Level. If only energy below the UPS-Level is available, this energy may not be enough to power the platform until the GTG is fully powered up. |
| | UPS-Level . . . <Max-Level | ESS is available. It is possible to charge and discharge the ESS. The grid support until a GTG is started is reliable possible. The stored energy is higher than the UPS-Level. |
| | Max-Level | ESS is available. It is possible to discharge the ESS. The grid support until a GTG is started is reliable possible. The stored energy is reached the Max-Level. |
| EDG | Off | EDG is off |
| | On | EDG is on and supplies the grid with energy. The GTG can now be started. |

Table 2 shows different EMS operation states. An EMS operation state defines the individual operating modes of the generators. For example, GTG1 may be activated and the almost fully charged ESS may be available. This state is defined as operation state 7.

There are states that rarely occur or are not called up by appropriate parameterization. For other states, the longest possible operating time is desired. For example, the operation state with the GTG1 switched on, the almost charged ESS and the activated WT.

The defined number of the EMS operation state is shown in the first column. This state number always refers only to a specific state.

The second and third columns show the GTG. A GTG should not be started and stopped all the time. A continuous operation is advantageous. Thus, generally only one GTG is started if the other GTG fails or the ESS is not available.

The fourth column refers to the WT. The WT provides wind-dependent fluctuating energy. To ensure a steady power supply, the WT is only activated when the ESS is available. The current operating mode of the WT is shown here.

The state of charge of the ESS in column five has an influence on the power set point of the WT. When the battery system is fully charged, the power of the WT is reduced. If the state of charge is below the UPS level, increasing the WT set point speeds up the charging process of the ESS.

In the sixth column of permission of the COTP start is shown. In some states, starting is blocked. This is the case if not enough energy is available.

The EMS monitors the status signals of the generators. An EMS operation state change is initiated by an operation mode change of a generator. If, for example, the state of charge of the ESS rises above a parameterized level, the mode of the ESS changes and so does the operation state of the EMS. The operation state transitions are displayed in column 7 (transition to operation state).

In column 8, the generator modes are shown.

TABLE 2

EMS Operation States

| State No. | GTG 1 | GTG 2 | WT | ESS | COTP | Operation state transition | GTG1 | GTG 2 | ESS | WT |
|---|---|---|---|---|---|---|---|---|---|---|
| 1 | On | Off | Off | Off | COTP start unreliable. Block COTP start | ESS available → 6<br>GTG2 available → 3<br>GTG 1 tripped → fault (30)<br>stop demand → 40 | X | | | |
| 2 | Off | On | Off | Off | COTP start unreliable. Block COTP start | ESS available → 11<br>GTG 1 available → 3<br>GTG 2 tripped → fault (30)<br>stop demand → 40 | | X | | |
| 3 | On | On | Off | Off | COTP start enable | ESS available → 4<br>GTG 1 tripped → 2<br>GTG 2 tripped → 1<br>stop demand → 40 | X | X | | |
| 4 | On | On | Off | <UPS-Level charged by GTG up to UPS-level | COTP start enable | WT available → 5<br>ESS >= UPS-Level →7<br>ESS not available → 3<br>GTG1 tripped → 11<br>GTG2 tripped → 6<br>stop demand → 40 | X | X | X | |
| 5 | On | On | Up to level-2 | <UPS-Level charged by WT/GTG | COTP start enable | WT not available →4<br>ESS > UPS-Level → 9<br>ESS not available → 3<br>GTG1 tripped → 13<br>GTG2 tripped → 8<br>stop demand → 40 | X | X | X | X |
| 6 | On | Off | Off | <UPS-Level charged by GTG up to UPS-level | COTP start unreliable. Block COTP start | WT available → 8<br>ESS >= UPS-Level →7<br>ESS not available → 1<br>GTG1 tripped → fault (30)<br>stop demand → 40 | X | | X | X |
| 7 | On | Off | Off | =UPS-Level, support grid, ESS energy is kept by GTG at UPS-level | COTP start enable when GTG1 has started | WT available → 9<br>ESS <= UPS-Level → 6<br>GTG1 tripped → 12<br>stop demand → 40 | X | | X | X |
| 8 | On | Off | Up to level-max | <UPS-Level charged by WT, support grid | COTP start unreliable. Block COTP start | WT not available →6<br>ESS > UPS-Level → 9<br>ESS not available → 1<br>GTG1 tripped → fault (30)<br>stop demand → 40 | X | | X | X |
| 9 | On | Off | Up to level-max | UPS-Level . . . Max-Level charged by WT, support grid | COTP start enable when GTG1 has started | WT not available → 7<br>ESS < UPS-Level → 8<br>ESS = UPS-max → 10<br>GTG1 tripped → 14<br>stop demand → 40 | X | | X | X |
| 10 | On | Off | Up to level-1 | Max-Level support grid | COTP start enable when GTG1 has started | WT not available → 7<br>ESS < UPS-Max → 9<br>GTG1 tripped → 15<br>stop demand → 40 | X | | X | X |
| 11 | Off | On | Off | <UPS-Level charged by GTG up to UPS-level | COTP start unreliable. Block COTP start | WT available → 13<br>ESS >= UPS-Level →12<br>ESS not available → 2<br>GTG2 tripped → fault (30)<br>stop demand → 40 | | X | X | |
| 12 | Off | On | Off | =UPS-Level, support grid, ESS energy is kept by GTG at UPS-level | COTP start enable when GTG2 has started | WT available → 14<br>ESS <= UPS-Level → 11<br>GTG2 tripped → 7<br>stop demand → 40 | | X | X | |
| 13 | Off | On | Up to level-max | <UPS-Level charged by WT, support grid | COTP start unreliable. Block COTP start | WT not available → 11<br>ESS > UPS-Level → 14<br>GTG2 tripped → fault (30)<br>stop demand → 40 | | X | X | X |
| 14 | Off | On | Up to level-max | UPS-Level . . . Max-Level charged by WT, support grid | COTP start enable when GTG2 is started | WT not available → 12<br>ESS < UPS-Level → 13<br>ESS = UPS-Max → 15<br>GTG2 tripped → 9<br>stop demand → 40 | | X | X | X |

TABLE 2-continued

EMS Operation States

| State No. | GTG 1 | GTG 2 | WT | ESS | COTP | Operation state transition | GTG1 | GTG 2 | ESS | WT |
|---|---|---|---|---|---|---|---|---|---|---|
| 15 | Off | On | Up to level-1 | Max-Level support grid | COTP start enable when GTG2 is started | WT not available → 12<br>ESS < UPS-Max → 14<br>GTG2 tripped → 10<br>stop demand → 40 | | X | X | X |

An objective for the EMS strategy may include, the longest possible operating time. For example, the operation state with the GTG1 switched on, the almost charged ESS and the activated wind turbine (see Table 2, State 9). The defined number of the EMS operation state is shown in the first column (see Table 2).

The second and third columns show a GTG. In this EMS strategy, a GTG should not be started and stopped all the time. A continuous operation is advantageous. Thus, generally only one GTG is started if the other GTG fails or the ESS is not available.

The fourth column refers to the wind turbine. The wind turbine provides wind-dependent fluctuating energy. As part of the EMS strategy, to ensure a steady power supply, the wind turbine is only activated when the ESS is available.

The state of charge of the ESS in column five has an influence on the power setpoint of the wind turbine. When the battery system is fully charged, the power of the wind turbine is reduced. If the state of charge is below the UPS level, increasing the wind turbine setpoint speeds up the charging process of the ESS.

In the sixth column of Table 2 permission of the COTP start is shown. In some states, starting is blocked. This is the case if not enough energy is available.

The EMS monitors the status signals of the generators. An EMS operation state change is initiated by an operation mode change of a generator. If, for example, the state of charge of the ESS rises above a parameterized level, the mode of the ESS changes and so does the operation state of the EMS. The operation state transitions are displayed in Table 2, column 7 (transition to operation state).

In column 8, the generator modes are shown with icons for a quick recording of the EMS operation state situation.

Figure 1A:
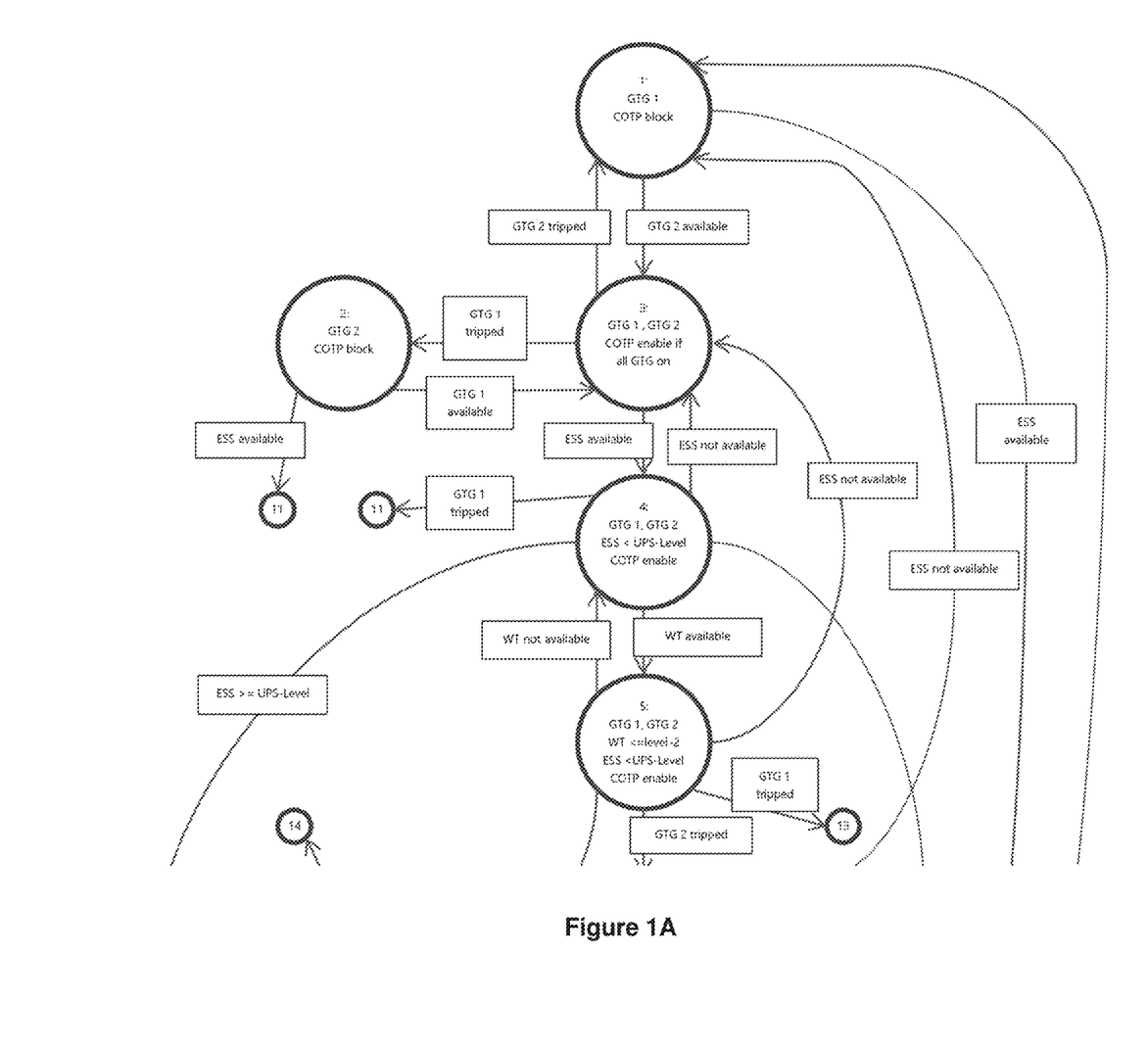
FIGS. 1A and 1B form a single flow chart of the relationship between states of an EMS according to one embodiment of the present invention.
Figure 1B:
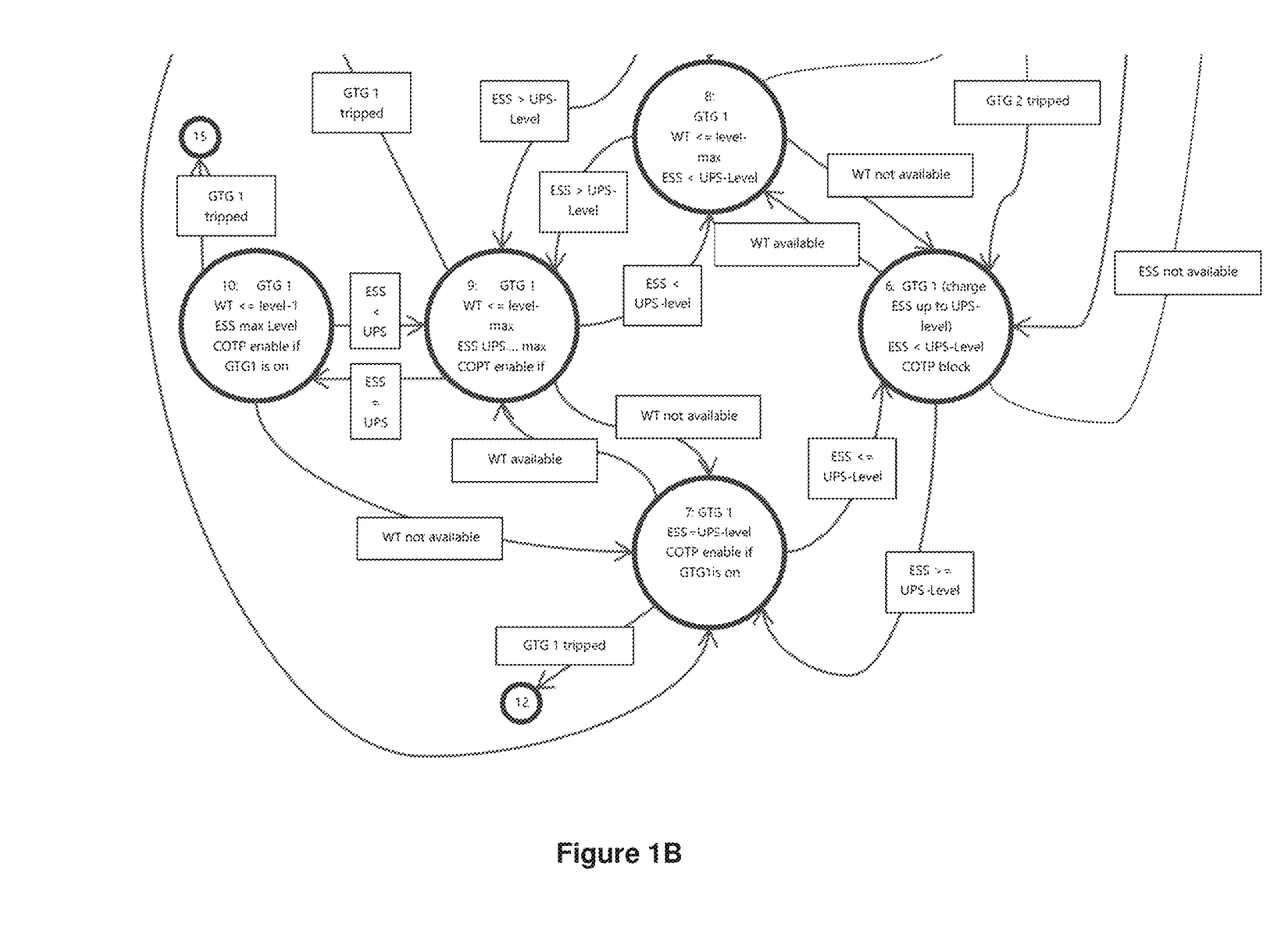
Figure 1C:
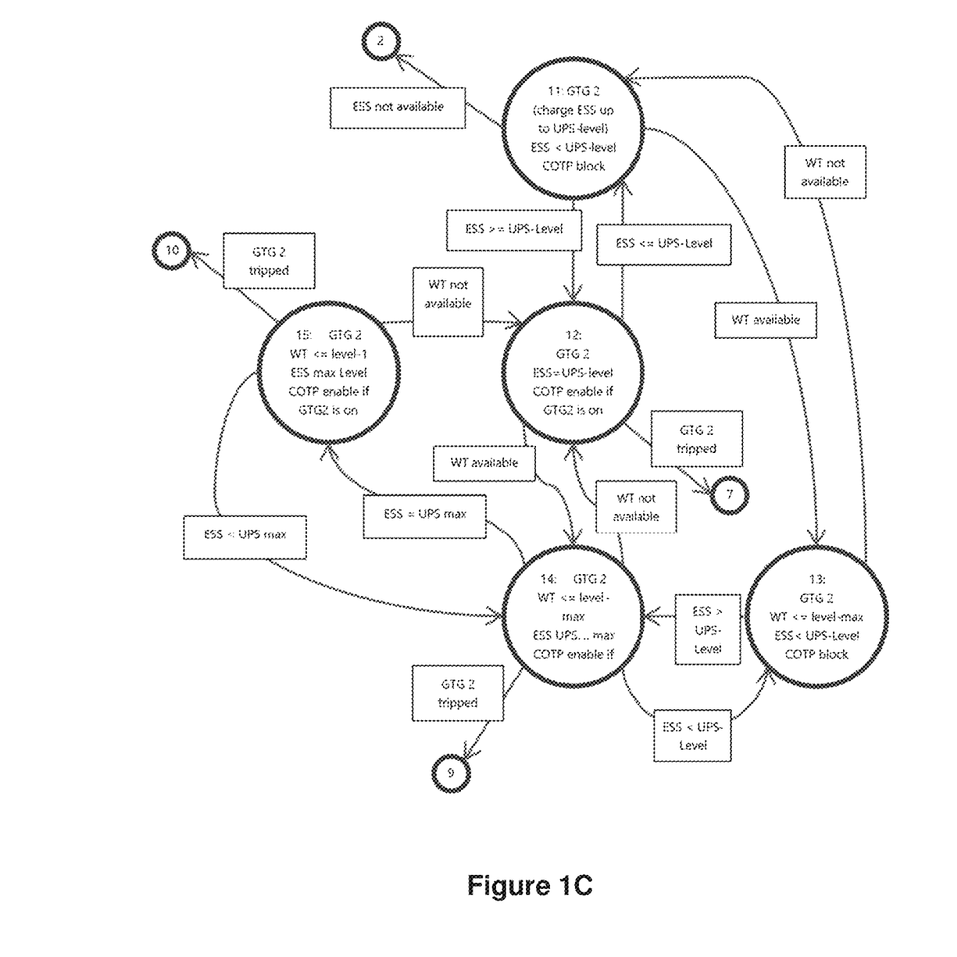
FIG. 1C is a flow chart of the relationship between states of an EMS according to second embodiment of the present invention.
Figure 1D:
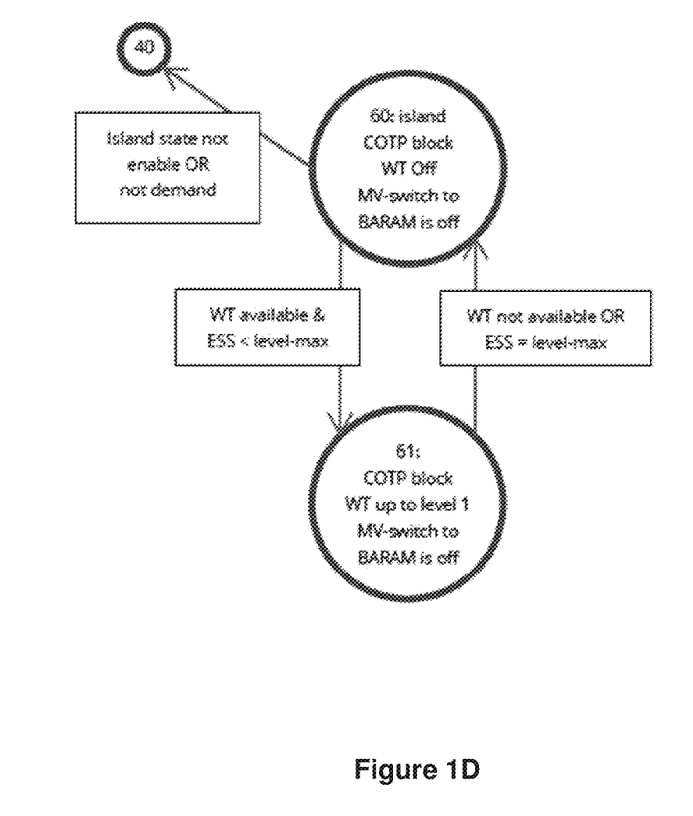
FIG. 1D is a flow chart of the relationship between states of an EMS according to third embodiment of the present invention.
Figure 1E:
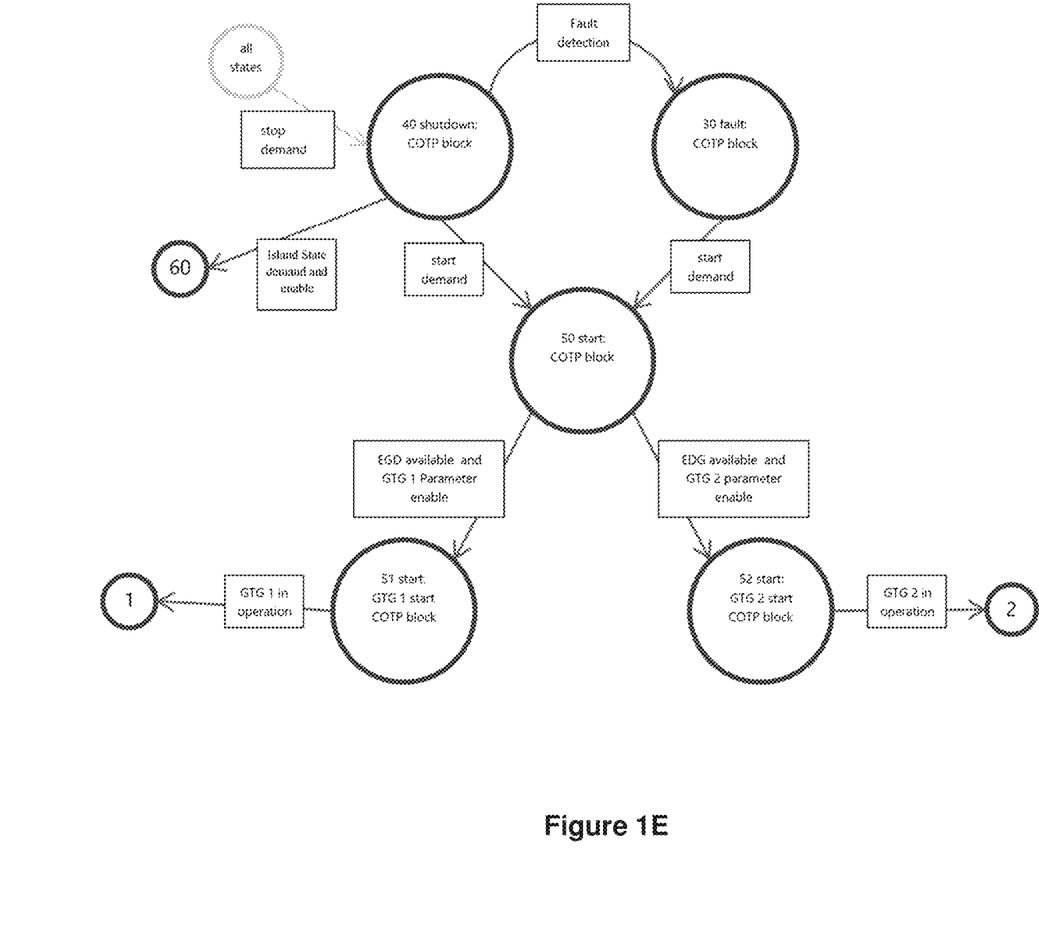
FIG. 1E is a flow chart of the relationship between states of an EMS according to fourth embodiment of the present invention.

FIGS. 1D and 1E define a set of 'special' EMS operation states as shown in Table 3 and 3. In case of an error, all generators are switched to the operation mode "OFF".

TABLE 3

(EMS Operation State: "Fault")

| State No. | GTG 1 | GTG 2 | WT | ESS | COTP | Transition parameter | GTG1 | GTG 2 | ESS | WT |
|---|---|---|---|---|---|---|---|---|---|---|
| 30 fault | OFF | Off | Off | Off | Block COTP start | Start demand → 50 | | | | |

50

The shutdown operation state is activated by manual request. In this state all generators are switched to operation mode "OFF".

TABLE 4

(EMS Operation State: "Shutdown")

| State No. | GTG 1 | GTG 2 | WT | ESS | COTP | Transition parameter | GTG1 | GTG 2 | ESS | WT |
|---|---|---|---|---|---|---|---|---|---|---|
| 40 shutdown | OFF | Off | Off | Off | Block COTP start | Fault detection → 30<br>start demand → 50<br>Island state demand and enable → 60 | | | | |

If the power supply is to be reactivated from the operation state "shutdown" (40) or "fault" (30), the operation state 50 is activated. Activation may be by manual request.

TABLE 6

(EMS Operation State: "Island")

| State No. | GTG 1 | GTG 2 | WT | ESS | COTP | Transition parameter | GTG1 | GTG 2 | ESS | WT |
|---|---|---|---|---|---|---|---|---|---|---|
| 60 island | Off | Off | Off | ON | Block COTP start MV-switch to BARAM is off | WT available & ESS < level-max → 61 Island state not enable OR not demand →40 | | | | X |
| 61 | Off | Off | Up to level 1 | On | Block COTP start MV-switch to BARAM is off | ESS = level-max → 60 WT not available → 60 | | | X | X |

The EMS proposed herein also takes into account the various operating constraints such as the time taken for field operations personnel to perform manual restarts to the GTG as well as the starting current requirements.

It is clear from the above tables that whenever at least one GTG is offset by the power produced by the wind turbine, fuel gas savings is possible which can then be monetized.

TABLE 5

(EMS Operation State: "Start")

| State No. | GTG 1 | GTG 2 | WT | ESS | COTP | Transition parameter | GTG1 | GTG 2 | ESS | EDG |
|---|---|---|---|---|---|---|---|---|---|---|
| 50 start | Off | Off | Off | Off | Block COTP start | Startup use EDG for black start EGD available and GTG1 Parameter enable→ 51 EGD available and GTG2 Parameter enable→ 52 | | | | X |
| 51 | start | Off | Off | Off | Block COTP start | GTG1 in operation →1 | X | | | X |
| 52 | OFF | start | OFF | OFF | Block COTP start | GTG 2 in operation → 2 | | X | | X |

If the wind turbine and the ESS are to be separated from land-based grid and supplied with energy autonomously, the island state can be activated. This state may be used during maintenance of the platform, for example. In this island state, the MV-switch to the platform grid may be deactivated and the ESS (MSC) arranged to supply the aggregates of the WT with energy. If the WT and enough wind are available, then the state 61 is activated (The ESS is charging).

In a further aspect, using the EMS strategy alongside self-contained integrated floating offshore wind-turbine may facilitate the gradual 'transition' of an offshore platform into a fully wind powered platform or operate in such a hybrid GTG-Wind mode until its end of life with minimal impact to production operations.

Figure 3:
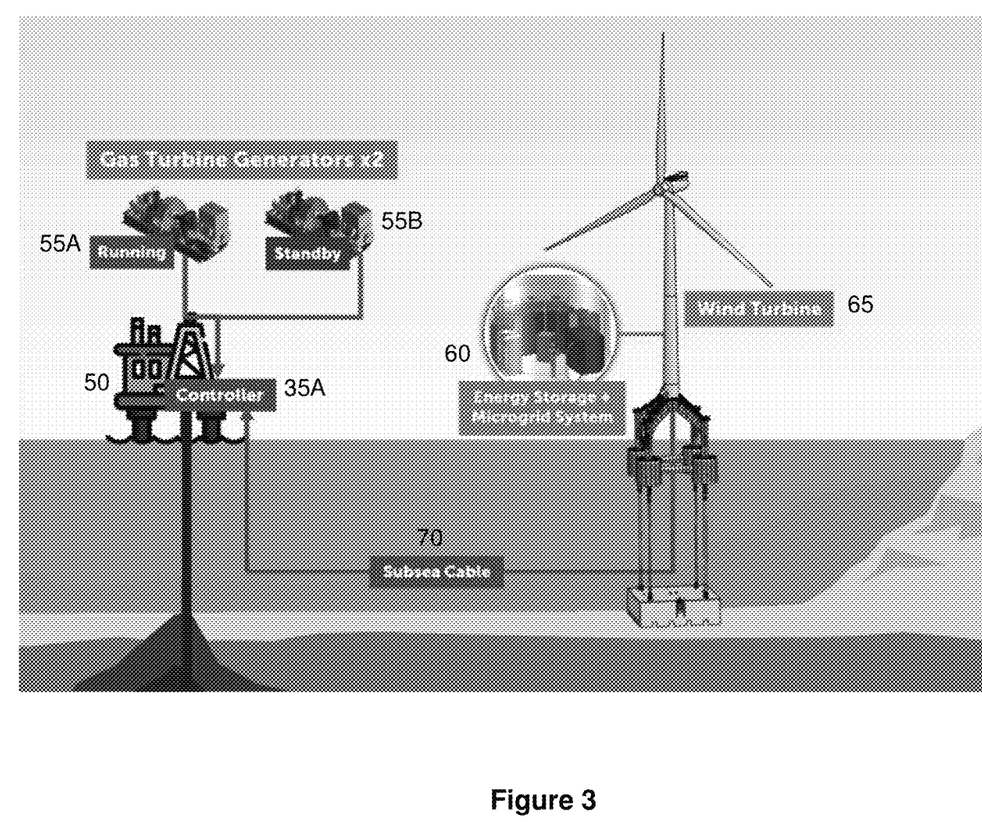
FIG. 3 is a schematic view of an EMS and microgrid according to a second embodiment of the present invention.

FIG. 3 shows a self-contained integrated floating offshore wind-turbine (SCIFOWT) facility 65 according to one embodiment of the present invention (FIG. 1). The wind turbine 65 that houses the energy storage and corresponding electronics/electrical components 60 without the need of a separate substation and/or without the need to take up host-platform deck space.

Figure 4:
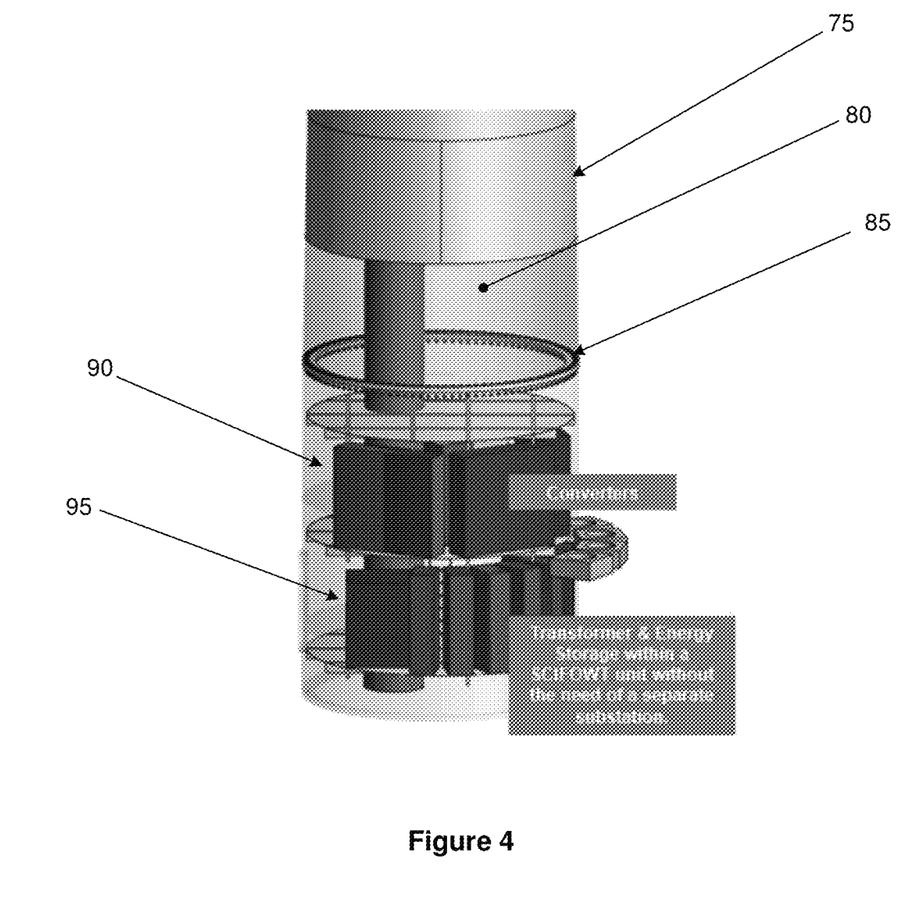
FIG. 4 is an isometric cut-away view of a self-contained integrated floating offshore wind-turbine according to one embodiment of the present invention.
Figure 5:
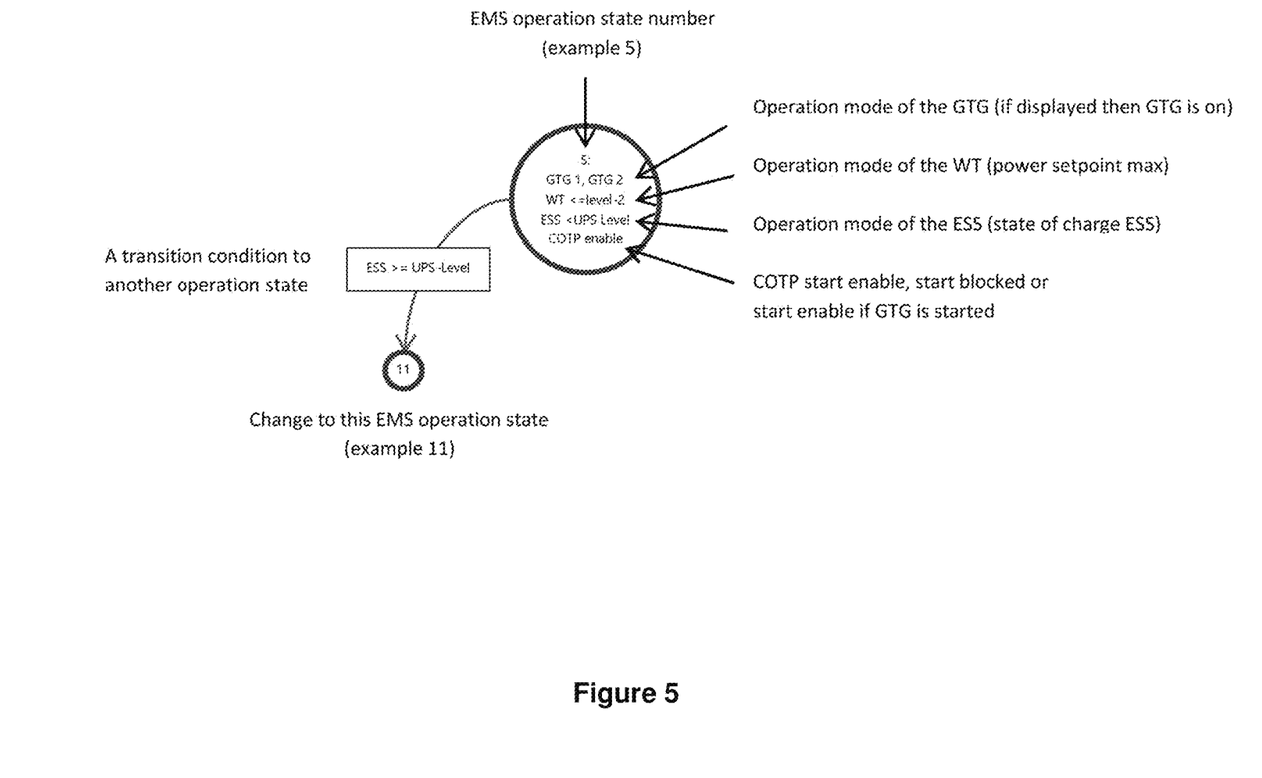
FIG. 5 is a legend for the flow charts of FIGS. 1A to 1E.

FIG. 4 shows the energy storage and transformer 90, 95 being self-contained in a cavity 80 of the tubular tower structure 75 of the wind turbine. Further, this may be contained within a submerged portion of the substructure 75 which has an added benefit of being to capitalize on the ambient water-cooling effects. Having the cavity below the water line may have the added benefit of lowering the operating costs related to cooling. For tubular spaces 80 such as a wind turbine tower or a cylindrical/spherical buoyancy device, the energy storage 95 can be arranged in a modular cabinet fashion in order to accommodate the necessary radius. When placed within a submerged member (or a substructure portion which exterior is submerged below sea level), the energy storage can be placed in close vicinity or direct contact with the walls or structural members i.e. hull stiffeners which double function as heat conducting elements. This will directly reduce the costs of keeping the energy storage cool, especially in tropical weather.

The SCIFOWT may provide an all-in-one mobile 'roving-dynamo-with-energy-store' which may be used in a sequence of fields (for instance, it may be mobilized from one field to another) which require such power. Additionally, it is also scalable in the sense that it can be scaled upwards to the point where a substation's economics is justifiable. For example, if a single SCIFOWT unit is deemed inadequate for a particular use case, but the said use case still does not justify deployment of a wind farm scale system, it may simply be combined with another unit of SCIFOWT since each SCIFOWT unit is self-contained. In other words, the SCIFOWT provides modularity to scale as required as in 'plug' and 'play' and serves to bridge the energy requirement levels that are prior to justifiable wind farm (hence dedicated substation) investment. For instance, substations for wind farms are typically erected on their own separate platform.

Signals from the generators are available to the EMS. The EMS is thus able to respond to changing generator operation modes with adaptation of the EMS operation state. In the event of an operation state change, set points for the generators may change and transmitted to the corresponding generators.

Parameters allow to flexibly design the EMS operation state system.

TABLE 7

Main parameter list

| Generator | Parameter | Comment |
|---|---|---|
| GTG1 | Enable | Enable of the GTG use. Can be disabled, for example, in case of a longer defect or maintenance. Operation states with this GTG are not called when it is disabled [TRUE or FALSE]. |
| | Start-time-max | Maximum time until the GTG started up. Value is used for monitoring and error detection [s]. E.g. 1800 s = 30 minutes |
| GTG2 | Enable | Enable of the GTG use. Can be disabled, for example, in case of a longer defect or maintenance. Operation states with this GTG are not called when it is disabled [TRUE or FALSE]. |
| | Start-time-max | Maximum time until the GTG started up. Value is used for monitoring and error detection [s]. E.g. 1800 s = 30 minutes |
| WT | Enable | Enable of the WT use. Can be disabled, for example, in case of a longer defect or maintenance. Operation states with this WT are not called when it is disabled [TRUE or FALSE]. |
| | Power-level 1 | WT power setpoint level 1. WT does not exceed this setpoint [KW]. E.g. 750 kW |
| | Power-level 2 | WT power setpoint level 2. WT does not exceed this setpoint [kW]. E.g. 1500 kW |
| | Power level-max | WT power setpoint level 2. WT does not exceed this setpoint [KW]. E.g. 2000 kW |
| ESS | UPS-level | The minimally stored energy to provide the system during start-up of a GTG [kWh]. E.g. 600 kWh |
| | Max-level | Maximum value of the energy stored in the ESS [kWh]. E.g. 1344 kWh |

The invention claimed is:

1. A method of controlling operation of a microgrid using an energy management system (EMS), the microgrid comprising a plurality of distributed energy resources including at least one controllable distributed hydrocarbon fueled generator and electrical energy storage devices, the method comprising:
    the EMS measuring a cumulative availability status of each distributed energy resource, and assigning a state of the microgrid based upon said cumulative availability status;
    determining whether a critical operation can proceed based upon said state; and
    enabling the critical operation based upon the determining step having a predetermined outcome.

2. The method according to claim 1, wherein the distributed energy resources include a renewable energy resource.

3. The method according to claim 1, wherein the predetermined outcome includes the at least one hydrocarbon fueled generator being available.

4. The method according to claim 3, wherein the predetermined outcome further includes the energy storage system being at least partially charged.

5. The method according to claim 4, wherein the predetermined outcome further includes the energy storage system when in a partially charged status, said charging is provided by the renewable energy source.

6. The method according to claim 5, further including repeating the measuring step, such that on a change of the cumulative availability status, the EMS changes the state of the microgrid.

7. The method according to claim 1, further including repeating the measuring step, such that on a change of the cumulative availability status, the EMS changes the state of the microgrid.

8. An energy management system (EMS) for controlling an operation of a microgrid;
    the microgrid comprising a plurality of distributed energy resources including at least one controllable distributed hydrocarbon fueled generator and an electrical energy storage device;
    the EMS arranged to measure a cumulative availability status of each distributed energy resource, and assign a state of the microgrid based upon said cumulative availability status;
    said EMS arranged to enable a critical operation upon said state.

9. The EMS according to claim 8, wherein the distributed energy resources include a renewable energy resource.

10. The EMS according to claim 9, wherein the renewable energy resource is arranged to charge the energy storage system.

11. A wind-turbine facility comprising:
    a wind turbine connectable to a microgrid;
    an energy storage system according to claim 1 mounted within a cavity of a substructure of the wind turbine, said energy storage system arranged to be connected to the microgrid;
    wherein said wind turbine is arranged to charge said energy storage system.

12. The wind turbine facility according to claim 11, wherein said wind turbine is a floating offshore wind turbine.

13. The wind turbine facility according to claim 11, wherein the cavity is at least partly below a water line on which the facility floats.

* * * * *